(12) United States Patent
Oh

(10) Patent No.: US 7,565,296 B2
(45) Date of Patent: Jul. 21, 2009

(54) DIGITAL AUDIO WATERMARK INSERTING/DETECTING APPARATUS AND METHOD

(75) Inventor: Hyan O Oh, Seoul (KR)

(73) Assignee: LG Electronics Inc., Seoul (KR)

(*) Notice: Subject to any disclaimer, the term of this patent is extended or adjusted under 35 U.S.C. 154(b) by 621 days.

(21) Appl. No.: 11/023,221

(22) Filed: Dec. 27, 2004

(65) Prior Publication Data

US 2005/0144006 A1   Jun. 30, 2005

(30) Foreign Application Priority Data

Dec. 27, 2003   (KR) .................... 10-2003-0098069

(51) Int. Cl.
*G10L 21/00* (2006.01)
(52) U.S. Cl. ..................... 704/273; 382/100
(58) Field of Classification Search ............ 380/46, 380/53, 54, 59, 200, 201, 206, 207, 236, 380/237, 239; 381/56, 61; 382/250; 364/752; 700/94

See application file for complete search history.

(56) References Cited

U.S. PATENT DOCUMENTS

| | | | | |
|---|---|---|---|---|
| 5,508,949 | A * | 4/1996 | Konstantinides | 708/402 |
| 6,061,793 | A * | 5/2000 | Tewfik et al. | 713/176 |
| 6,330,672 | B1 * | 12/2001 | Shur | 713/176 |
| 6,493,457 | B1 * | 12/2002 | Quackenbush et al. | 382/100 |
| 6,571,144 | B1 * | 5/2003 | Moses et al. | 700/94 |
| 6,633,654 | B2 * | 10/2003 | Hannigan et al. | 382/100 |
| 6,952,774 | B1 * | 10/2005 | Kirovski et al. | 713/176 |
| 7,006,555 | B1 * | 2/2006 | Srinivasan | 375/133 |
| 7,020,285 | B1 * | 3/2006 | Kirovski et al. | 380/238 |
| 7,113,596 | B2 * | 9/2006 | Rhoads | 380/54 |
| 7,451,092 | B2 * | 11/2008 | Srinivasan | 704/500 |
| 7,469,342 | B2 * | 12/2008 | Watanabe | 713/176 |
| 2001/0049788 | A1 * | 12/2001 | Shur | 713/179 |
| 2003/0102660 | A1 | 6/2003 | Rhoads | |
| 2008/0273747 | A1 * | 11/2008 | Rhoads | 382/100 |
| 2009/0097702 | A1 * | 4/2009 | Rhoads | 382/100 |

FOREIGN PATENT DOCUMENTS

| | | | |
|---|---|---|---|
| EP | 0966 109 A2 | * | 12/1999 |
| WO | WO 00/39955 | * | 6/2000 |
| WO | WO 02/49363 | * | 6/2002 |
| WO | WO 02/49363 A1 | * | 6/2002 |

OTHER PUBLICATIONS

Lintian Qiao and Klara Nahrstedty, "Non-Invertible Watermarking Methods For MPEG Encoded Audio", Department of Computer Science University of Illinois at Urbana-Champaign, 1304 West Springfield Avenue, Urbana, IL 61801, U.S.A, Jun. 25, 1998,pp. 1-12.*

(Continued)

*Primary Examiner*—Samir A. Ahmed
*Assistant Examiner*—Mekonen Bekele
(74) *Attorney, Agent, or Firm*—Lee, Hong, Degerman, Kang & Waimey

(57) ABSTRACT

The present invention relates to a digital audio watermark inserting/detecting method and apparatus. The present invention provide the digital audio watermark inserting method having the step of encoding a digital audio signal by using a scale factor table, the method including the steps of: transforming the digital audio signal into a plurality of sub-band samples; extracting a scale factor being an amplitude factor of the transformed sub-band samples; transforming the extracted scale factor into a scale factor index by using the scale factor table; and inserting a watermark signal into the scale factor index in the transforming of the extracted scale factor. Accordingly, the present invention has an effect in that the additional noise or distortion is not caused while the watermark is effectively inserted.

13 Claims, 6 Drawing Sheets

OTHER PUBLICATIONS

Raymond B. Wolfgang, Christine I. Podilchuk and Edward J. Delp, "Perceptual Watermarks for Digital Images and Video", Proceedings of the IEEE, vol. 87, No. 7, Jul. 1999, pp. 1108-1126.*

Lintian Qiao and and Klara Nahrstedty, "Non-Invertible Watermarking Methods For MPEG Encoded Audio", Department of Computer Science University of Illinois at Urbana-Champaign, 1304 West Springfeld Avenue, Urbana, IL 61801, U.S.A, Jun. 25, 1998, pp. 1-1.*

* cited by examiner

FIG. 4

| index | scalefactor | index | scalefactor |
|---|---|---|---|
| 0 | 2.00000000000000 | 32 | 0.00123039165029 |
| 1 | 1.58740105196820 | 33 | 0.00097656250000 |
| 2 | 1.25992104989187 | 34 | 0.00077509816991 |
| 3 | 1.00000000000000 | 35 | 0.00061519582514 |
| 4 | 0.79370052598410 | 36 | 0.00048828125000 |
| 5 | 0.62996052494744 | 37 | 0.00038754908495 |
| 6 | 0.50000000000000 | 38 | 0.00030759791257 |
| 7 | 0.39685026299205 | 39 | 0.00024414062500 |
| 8 | 0.31496026247372 | 40 | 0.00019377454248 |
| 9 | 0.25000000000000 | 41 | 0.00015379895629 |
| 10 | 0.19842513149602 | 42 | 0.00012207031250 |
| 11 | 0.15749013123686 | 43 | 0.00009688727124 |
| 12 | 0.12500000000000 | 44 | 0.00007689947814 |
| 13 | 0.09921256574801 | 45 | 0.00006103515625 |
| 14 | 0.07874506561843 | 46 | 0.00004844363562 |
| 15 | 0.06250000000000 | 47 | 0.00003844973907 |
| 16 | 0.04960628287401 | 48 | 0.00003051757813 |
| 17 | 0.03937253280921 | 49 | 0.00002422181781 |
| 18 | 0.03125000000000 | 50 | 0.00001922486954 |
| 19 | 0.02480314143700 | 51 | 0.00001525878906 |
| 20 | 0.01968626640461 | 52 | 0.00001211090890 |
| 21 | 0.01562500000000 | 53 | 0.00000961243477 |
| 22 | 0.01240157071850 | 54 | 0.00000762939453 |
| 23 | 0.00984313320230 | 55 | 0.00000605545445 |
| 24 | 0.00781250000000 | 56 | 0.00000480621738 |
| 25 | 0.00620078535925 | 57 | 0.00000381469727 |
| 26 | 0.00492156660115 | 58 | 0.00000302772723 |
| 27 | 0.00390625000000 | 59 | 0.00000240310869 |
| 28 | 0.00310039267963 | 60 | 0.00000190734863 |
| 29 | 0.00246078330058 | 61 | 0.00000151386361 |
| 30 | 0.00195312500000 | 62 | 0.00000120155435 |
| 31 | 0.00155019633981 | | |

FIG. 5

| Header (32) | CRC (16) | Bit Allocation [2..4]/SB | SCFSI [2] | Watermarked ScaleFactor[6] | Samples [2..16] | Ancillary Data |

DIGITAL AUDIO WATERMARK INSERTING/DETECTING APPARATUS AND METHOD

This application claims the benefit of the Korean Application No. P2003-98069 filed on Dec. 27, 2003 which is hereby incorporated by reference.

BACKGROUND OF THE INVENTION

1. Field of the Invention

The present invention relates to a digital audio watermark, and more particularly, to an apparatus and method of inserting and detecting watermark information within a bit steam in a high quality audio encoding process.

2. Discussion of the Related Art

Watermarking refers to embedding secret information called "watermark" into a medium such as video, image, audio and text. The embedded watermark information can be extracted with limitation to those who know it. Medium having a watermark is recognized by common users to be the same as a general medium.

Specifically, a digital medium brings about a new issue of a copyright protection, due to its advantage comparing with an analogous medium, in which access, transmission, edition and keeping are easy and data degradation is not caused at the time of data distribution through an electric wave or a communication network. Digital watermarking is noted as means for protecting a copyright.

The digital watermarking is not only used for inserting information to distinguish a proprietor to protect the copyright, but is also used for inserting control information for anti-copy, distribution confirmation, a broadcasting monitoring and the like or used for inserting information such as presentation time control information, synchronization (lip-sync), contents information and song words into a real time medium such as audio, video and the like and transmitting the inserted information.

As such, the digital watermarking has a different characteristic depending on a variety of usage purposes, but imperceptibility and robustness are no doubt essential.

The imperceptibility being the most basic requirement means that an original medium and a watermark inserted medium are not distinguished from each other when users view or listen to them.

The robustness means that even though the watermark inserted medium is deformed such as filtering, compressing, noise addition and degradation required for distribution and transmission, the inserted watermark should be preserved.

Specifically, a watermark for the copyright protection and the anti-copy should be robust so that it can cope with an intentional attack intended to eliminate the watermark. Meanwhile, a watermark for forgery-free is easily extinguished when it is deformed or manipulated.

Further, a watermark for embedding additional information such as presentation time control information, lip-sync, contents information and song words into the medium has a relatively low robustness against the intentional attack or distortion.

A general method of the digital watermarking is illustrated in FIG. 1.

As shown in FIG. 1, watermark data is embedded into a digital medium (audio, video, image, text and the like) by using a watermark insertion system 1. At this time, a secret or public key for security can be additionally used depending on a watermarking algorithm.

After that, the inserted watermark can be extracted from a watermark inserted medium by using a watermark extraction system 2. At this time, an original medium can be required depending on the watermark algorithm, and the decoding can be also performed using only the public key required at the time of inserting.

A system not requiring the original medium in a watermark extracting process is called "blind watermarking".

Among watermarking methods, an audio signal watermarking method is variously exemplified such as a Least Significant Bit (LSB) encoding method, an echo hiding method, and a spread spectrum communication method and the like.

In the LSB encoding method, least significant bits of a quantized audio sample are deformed to insert desired information. The LSB encoding method uses a characteristic in which the deforming of the least significant bit of an audio signal does not almost have influence on a sound quality. The LSB encoding method has an advantage in that insertion and detection is simply performed and the sound quality is less distorted, but has a drawback in that it is vulnerable to signal processing such as loss compression or filtering.

Further, in the echo hiding method, an inaudible echo is inserted into an audio signal. That is, the echo hiding method inserts and encodes an echo with a different time delay into the audio signal, which is subdivided at a predetermined interval, depending on binary watermark information to be inserted. In a decoding process, binary information is decoded by detecting an echo time delay at each of subdivided durations. In this case, the inserted signal is not a noise, but is the audio signal itself having the same characteristic as an original signal. Therefore, even though the inserted signal is heard, the inserted signal is not recognized as a distorted signal. The inserted signal is rather expected to provide a better tone. Accordingly, the echo hiding method is suitable to a high quality audio watermarking, but has a disadvantage in that since the detecting is performed using a Cepstrum operation, an operation amount of decoding is very high, and in case where the synchronization for the duration to be subdivided at a time-domain is missed, the decoding is not performed.

Further, the spread spectrum communication method is a typical watermarking method, which is popularized for video watermarking and most studied even for audio watermarking. In the spread spectrum communication method, an audio signal is transformed into a frequency through a discrete Fourier transformation and then, binary watermark information is spectrum-spread to a PN (Pseudo Noise) sequence to insert spread information into the frequency-transformed audio signal. An inserted watermark can be detected using a correlator by using a high auto-correlation characteristic of the PN sequence, and have a characteristic of robustness against interference and an excellent encryptability. On the contrary, the spread spectrum communication method has a drawback in that a sound quality is deteriorated, an operation amount of insertion and detection is very high, and a compression encoding is incomplete in case where the watermark is inserted with a large energy to improve robustness.

As such, summarizing the conventional audio watermarking, the conventional audio watermarking has a drawback in that its implementation method is complex since the watermark information is generally inserted into the original signal before the original signal is compressed and decoded, and accordingly the operation amount is required much and the original signal is easily deformed when it is compressed.

SUMMARY OF THE INVENTION

Accordingly, the present invention is directed to a digital audio watermark inserting/detecting apparatus and method that substantially obviates one or more problems due to limitations and disadvantages of the related art.

An object of the present invention is to provide a digital audio watermark inserting/detecting apparatus and method in which watermark data is inserted into a bit stream when digital audio data is compressed and encoded, to prevent the distortion of an original signal and an inserted watermark and to facilitate the inserting of the watermark data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital audio watermark inserting method having the step of encoding a digital audio signal by using a scale factor table, the method including the steps of: transforming the digital audio signal into a plurality of sub-band samples; extracting a scale factor being an amplitude factor of the transformed sub-band samples; transforming the extracted scale factor into a scale factor index by using the scale factor table; and inserting a watermark signal into the scale factor index in the transforming of the extracted scale factor.

In the inserting of the watermark signal, one scale factor index is allocated per one bit of the watermark signal.

The scale factor index is changed to an even number or an odd number depending on "0" or "1" of one bit of the watermark signal.

In case where the scale factor index is "0", the watermark signal is not inserted.

A minimal bit number of the watermark signal per frame to be transmitted is predetermined.

In case where the scale factor is transmitted less than the predetermined bit number of the watermark signal, a bit is forcibly allocated to an arbitrary sub-band and then, the watermark signal is inserted into a corresponding scale factor index.

The sub-band samples are all defined as "0", for the sub-band to which the bit is forcibly allocated to insert the watermark signal.

Specifically, it is desirable that the frames to be transmitted are bundled to adjust a watermark bit rate.

A secret/public key is used to distinguish the inserted watermark signal from other signals.

In another aspect of the present invention, there is provided a digital audio watermark inserting method in which a watermark signal is inserted into a digital audio signal by using a digital audio encoding step, the method including the steps of: transforming the digital audio signal into a plurality of sub-band samples to eliminate a statistic redundancy of the digital audio signal; extracting a scale factor being an amplitude factor of the transformed sub-band samples; receiving the digital audio signal to transform the received audio signal into a frequency area through Fourier transformation; obtaining a masking threshold being an inaudible noise level with reference to the extracted scale factor at the transformed frequency area, and calculating a SMR (Signal-to-Mask Ratio) at each of the sub-band samples on the basis of the obtained masking threshold; allocating a bit to each of the sub-band samples on the calculated SMR; receiving the extracted scale factor to transform the received scale factor into a scale factor index by using the scale factor table depending on an encoding standard of the digital audio signal; changing the scale factor index to insert the watermark signal into the scale factor index, in the transforming of the scale factor; respectively quantizing the plurality of sub-band samples by using the bit allocated to each of the sub-band samples and the scale factor index; and generating the quantized signal as a bit stream.

For the sub-band sample to which the bit is not allocated, the method includes the steps of: forcibly allocating the bit to the sub-band sample to which the bit is not allocated, depending on a predetermined minimal bit number of the watermark signal to be transmitted per frame; setting to an arbitary even or odd number of the scale factor index corresponding to the watermark signal to be inserted; and defining all of the forcibly bit-allocated sub-band samples as "0".

In a further aspect of the present invention, there is provided a digital watermark detecting method in which a watermark signal is detected from a compressed and transmitted bit stream of a digital audio signal, the method including the steps of: extracting scale factor index information from the bit stream; and determining an even number/an odd number of the extracted scale factor index to extract binary watermark information of "0" and "1".

In a still another aspect of the present invention, there is provided a digital audio watermark inserting apparatus in which a watermark signal is inserted into a digital audio signal (PCM) by using a digital audio encoder, the apparatus including: a sub-band filter bank for transforming the digital audio signal (PCM) into a plurality of sub-band samples; a scale factor extractor for extracting a scale factor being an amplitude factor of the transformed sub-band samples; and a watermark inserting and scale factor encoding unit for transforming the extracted scale factor into a scale factor index by using a scale factor table depending on an encoding standard of the digital audio signal, and changing the transformed scale factor index to insert the watermark signal into the scale factor index.

In a still another aspect of the present invention, there is provided a digital audio watermark detecting apparatus in which a watermark signal is detected from a compressed and transmitted bit stream of a digital audio signal, the apparatus including: a demultiplexer for extracting scale factor index information from the bit stream; and a watermark extractor for determining the even number/odd number of the extracted scale factor index to extract binary watermark information of "0" or "1".

Accordingly, the present invention has an effect in that the additional noise or distortion is not caused while the watermark is effectively inserted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a view illustrating a scale factor table according to a MPEG audio encoding method used in the present invention;

FIG. 5 is a view illustrating a MPEG audio bit stream structure in which a watermark is inserted into a scale factor index according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Through the present invention, a popularized general terminology is selected, but since a specific terminology is arbitrarily selected by the applicant and its meaning is in detail described in a detailed description of the present invention, the present invention should be understood on the basis of the meaning of the terminology, not a name of the terminology.

According to the present invention, a watermark is inserted into a bit stream in a high quality audio encoding process, and blind watermarking is performed to detect the inserted watermark without an original medium.

For this, on the basis of a MPEG layer-II audio encoding method being one of high quality audio encoding methods, an embodiment of the present invention is described.

Figure 1:
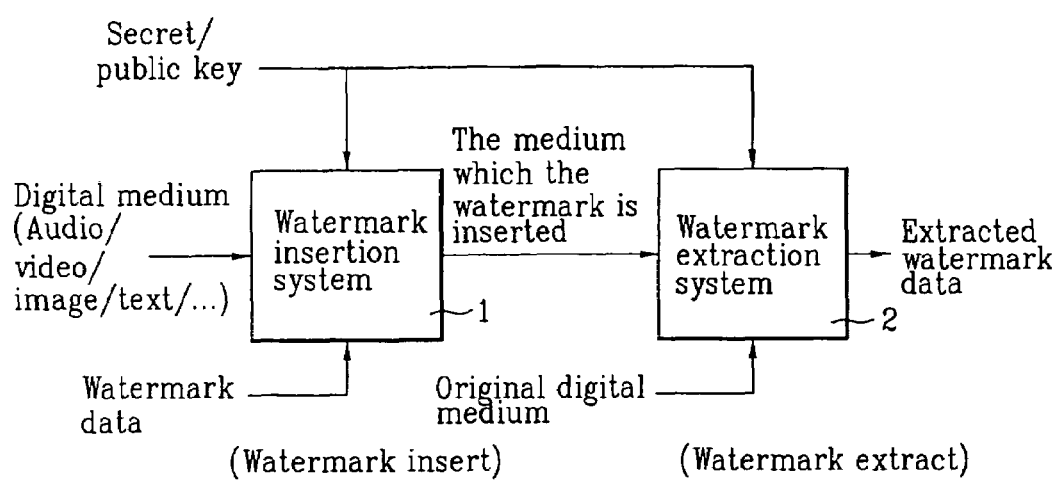
FIG. 1 is a conceptual view illustrating a general digital audio watermarking method.
Figure 2:
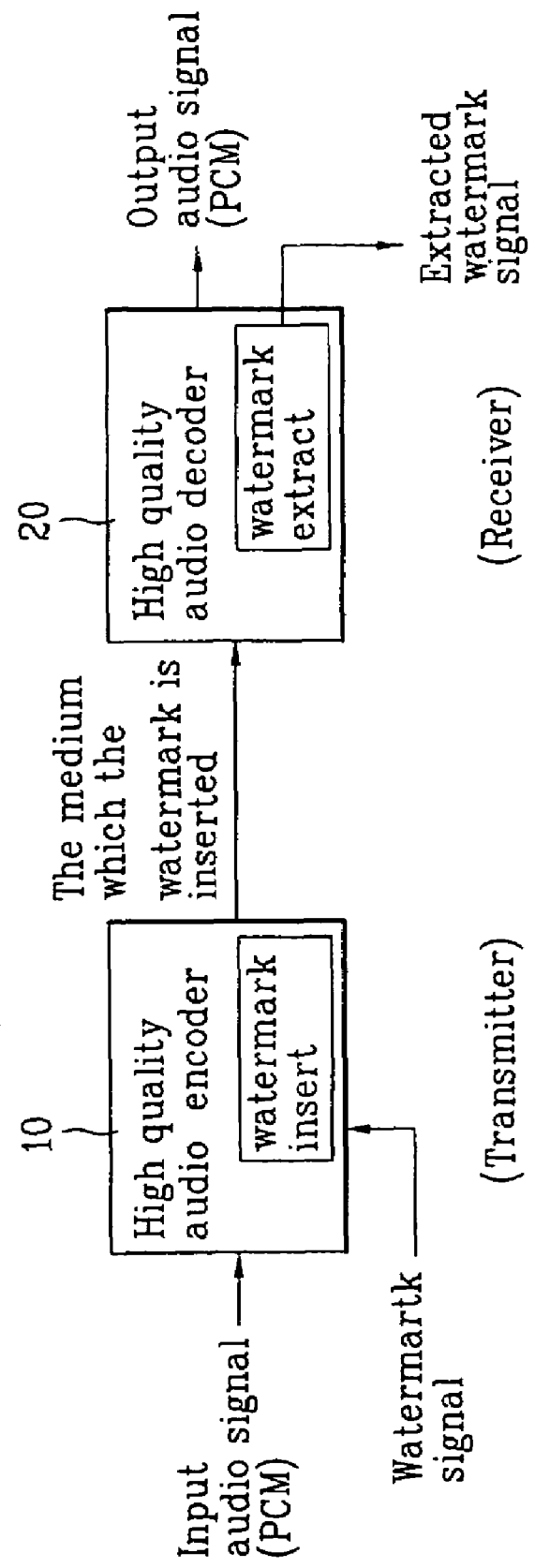
FIG. 2 is a view illustrating a whole digital audio watermarking system according to the present invention.

FIG. 2 is a view illustrating a whole digital audio watermarking system according to the present invention.

As shown in FIG. 2, the digital audio watermarking system includes a high quality audio encoder 10 and a high quality audio decoder 20 to insert and extract a watermark signal.

Figure 3:
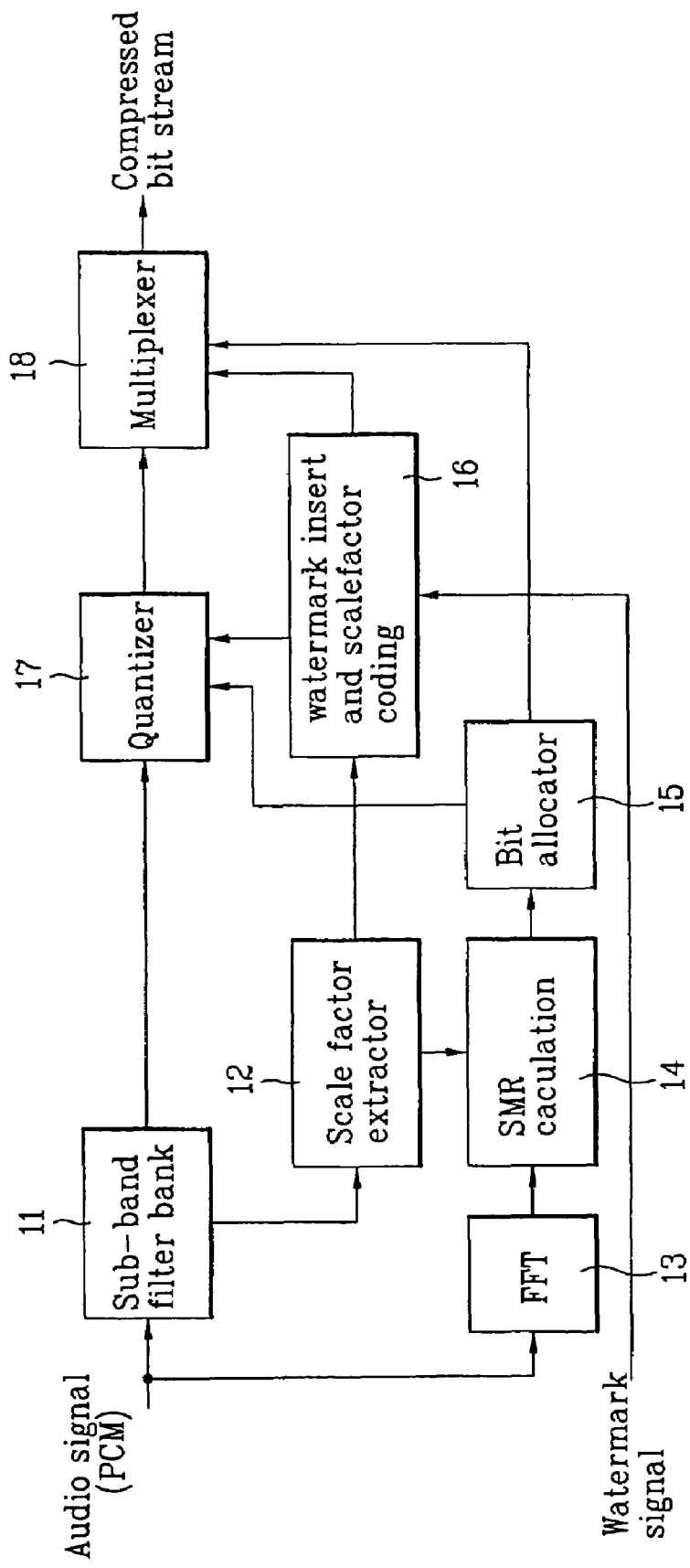
FIG. 3 is a block diagram illustrating a construction of a Moving Picture Experts Group (MPEG) audio encoder having a digital audio watermark inserting apparatus according to the present invention.

The high quality audio encoder 10 concurrently encodes a high quality audio signal and the watermark signal. The high quality audio encoder 10 inserts the watermark signal by using a digital audio watermark inserting apparatus, which is obtained by partially changing a construction of a general high quality audio encoder. This is shown in FIG. 3.

Further, the high quality audio decoder 20 extracts inserted watermark information by using a digital audio watermark extracting apparatus, which is obtained by partially changing a construction of a general high quality audio decoder for decoding an audio bit stream to generate an output audio signal.

Figure 6:
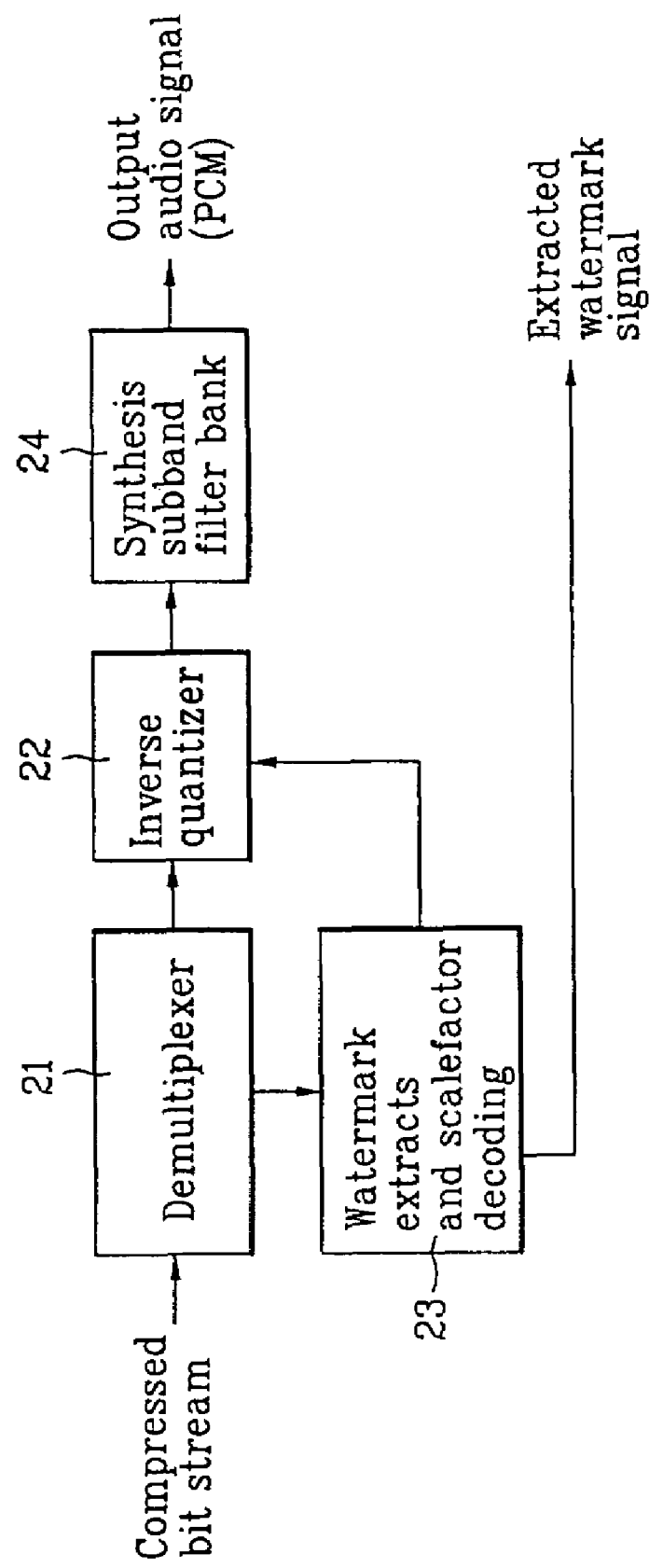
FIG. 6 is a block diagram illustrating a MPEG audio decoder having a digital audio watermark detecting apparatus according to the present invention.

At this time, the decoder not having the watermark extracting apparatus decodes the audio bit stream to generate only the output audio signal (PCM) not having the watermark signal. This is shown in FIG. 6.

The above-constructed watermarking system is described as follows with reference to the attached drawings.

As described above, FIG. 3 is a block diagram illustrating a construction of a Moving Picture Experts Group (MPEG) audio encoder having the digital audio watermark inserting apparatus according to the present invention. Specifically, the Moving Picture Experts Group (MPEG) audio encoder is exemplified as the high quality audio encoder.

First, like other high-quality audio encoding technologies, the MPEG audio encoder uses a psycho-acoustic model based on a human auditory characteristic to eliminate a perceptual redundancy of the audio signal, and has a type of being combined with a general data compression way to eliminate a statistical redundancy of the audio signal.

As shown in FIG. 3, the audio watermark inserting apparatus, which is connected with the MPEG audio encoder according to the present invention, includes a sub-band filter bank 11 for converting the audio signal (PCM) into 32 sub-band samples to eliminate the statistic redundancy of the audio signal (PCM); a scale factor extractor 12 for extracting a scale factor being an amplitude factor of the sub-band samples; a Fast Fourier Transformer (FFT) 13 for receiving the audio signal (PCM) to transform the received audio signal into a frequency area through Fourier transformation; a Signal-to-Mask Ratio (SMR) calculator 14 for obtaining a masking threshold, which is an inaudible noise level, with reference to the extracted scale factor in the transformed frequency area and calculating a SMR at each of sub-bands on the basis of the obtained masking threshold; a bit allocator 15 for allocating a bit to each of the sub-bands on the basis of the SMR; a watermark inserting and scale factor encoding unit 16 for receiving and encoding the extracted scale factor, and changing the encoding process of the extracted scale factor to insert binary watermark information; a quantizer 17 for respectively quantizing the 32 sub-bands by using the allocated bit and the encoded scale factor; and a multiplexer 18 for generating the quantized sub-bands as a bit stream together with additional information.

An operation of the above-constructed watermark inserting apparatus connected with the MPEG audio encoder according to the present invention is described as follows.

First, the sub-band filter bank 11 converts the audio signal into the sub-band sample to eliminate the statistic redundancy of the audio signal (PCM). The sub-band filter bank 11 is comprised of 32 weighted-superposition adding sub-band filters.

The SMR calculator 14 obtains the masking threshold being the inaudible noise level to eliminate the perceptual redundancy of the audio signal by the human auditory characteristic on the basis of the psycho-acoustic model, and calculates the SMR at each of the sub-bands on the basis of the obtained masking threshold.

The bit allocator 15 allocates the bit to each of the sub-bands on the basis of the calculated SMR so that a quantization noise can be subjectively masked by the signal (Reference document: ISO/IEC JTC/SC29/WG11 NO. 71 "Coding of Moving Pictures and Associated Audio for Digital Storage Media at up to about 1.5 Mbit/s-CD 11172-3 (Part 3. MPEG-Audio)", 1992). Meanwhile, the scale factor extractor 12 receives the 32 sub-band samples to extract the scale factor being the size factor.

Three scale factors are provided per each of the sub-bands. In other words, after 36 samples of one sub-band are respectively divided into 3 granules, a maximal value in each granule is allowed to become a scale factor candidate value.

However, a six-bit scale factor index, not the scale factor itself, are really transmitted to the bit stream.

In other words, a value most similar with the real scale factor (the most similar value among larger values than the real scale factor) is found in a scale factor table having 63 entities to transmit a corresponding index. The scale factor table is illustrated in FIG. 4.

Alternatively, in the MPEG layer-II encoding process according to the embodiment of the present invention, one to three scale factors are respectively transmitted in different patterns depending on SCale Factor Selection Information (SCFSI) to reduce a transmitted amount of the scale factor index.

That is, it is determined whether or not a similarity of three scale factor indices calculated in one sub-band. If it is determined that the three scale factor indices are similar with one another, one of them is sent as a representative value, and if it is determined that they are very different from one another, they are respectively sent.

Further, the bit allocator 15 controls not to transmit the SCale Factor Selection Information and the scale factor index for the sub-band to which the bit is not allocated, with reference to bit allocation information of each of the sub-bands. Accordingly, the scale factors to be transmitted can be different in number depending on frames.

If the number of the transmitted sub-bands is 30 at a specific frame, a mode is in stereo mode, and the bits are allocated to all of the sub-bands, the number of the transmitted scale factors is 180 (30*2*3) to the maximum. In this case, as a result, about 6,890 scale factors are transmitted per second.

According to the present invention, the watermark inserting and scale factor encoding unit 16 inserts the watermark signal into a scale factor index portion of the MPEG audio bit stream.

In other words, one-bit binary watermark is inserted into the transmitted scale factor index. This is in detail described as follows.

In case where the binary watermark to be inserted into a current scale factor index is "0", a corresponding scale factor index is set to an even number. In case where the binary watermark to be inserted is "1", a corresponding scale factor index is set to an odd number.

For example, if the current scale factor index (SI) is 35 and the binary watermark to be inserted into the current scale factor index is "0", the scale factor index (SI) is changed to 34. In case where the binary watermark to be inserted is "1", the scale factor index (SI) leaves as it is 35 without change.

In case where the binary watermark to be inserted is "0" in the above example, the scale factor index (SI) should be essentially changed to 34, not 36. This is because as the scale factor index is low, the scale factor is high on the scale factor table (referring to FIG. 4).

At this time, in case where the current scale factor index is "0", a binary number of 1 cannot be expressed. Therefore, the watermark signal is not inserted.

Below Table 1 shows an example of inserting a 12-bit watermark (for example, '011010101100') into 12 scale factor indices for deformation, by using the watermarking method according to the present invention.

TABLE 1

| | | | | | | | | | | | | |
|---|---|---|---|---|---|---|---|---|---|---|---|---|
| Binary watermark to be inserted | | | | | | 0 | | | | 1 | | |
| Scale factor index (before insertion) | 5 | 2 | 3 | 5 | 8 | 1 | 0 | 1 | 1 | 3 | 7 | 1 |
| Scale factor index (after insertion) | 4 | 1 | 3 | 4 | 7 | 0 | 9 | 0 | 1 | 3 | 6 | 0 |

As in the Table 1, in case where the binary watermark to be inserted is "0", a corresponding scale factor index is expressed as the even number. Accordingly, for example, the scale factor index (SI) is changed from 35 to 34. Further, in case where the binary watermark to be inserted is "1", a corresponding scale factor index is expressed as the odd number. Accordingly, for example, the scale factor index (SI) is changed from 32 to 31.

The quantizer 17 uses the deformed scale factor index using the inserting of the watermark and the bit allocated in the bit allocator 15 to quantize the sub-band samples.

The quantized signal, the allocated bit information and the transformed scale factor index are received from the multiplexer 18 and transformed into the bit stream to generate a compressed bit stream. The generated bit stream is not distinguished from a conventional audio bit stream.

An example of the generated bit stream is illustrated in FIG. 5.

In other words, FIG. 5 is a view illustrating a MPEG audio bit stream structure in which the watermark is inserted into the scale factor index according to the present invention.

As shown in FIG. 5, the audio bit stream structure includes a 32-bit packet header portion having information on a sampling frequency, a bit rate, a layer and the like; a CRC code for a 16-bit error correction; a bit allocation portion for expressing 2 to 4 bits of the bit allocation information at each of the sub-bands; 2-bit word SCale Factor Selection Information (SCFSI) portion for expressing select information relating to the scale factor; a watermarked ScaleFactor portion for storing a 6-bit word watermarked and deformed scale factor index; Samples portion for storing the quantized samples; and an ancillary data portion for storing ancillary information such as song words information.

In the watermark inserting method associating with the MPEG audio encoder, the sub-band samples are divided and quantized using the scale factor index deformed through the watermark insertion in the MPEG audio encoding process, and the transformed scale factor index is transmitted. Therefore, the insertion of the watermark does not cause additional noise or distortion.

However, there should be noted in some aspects of the watermark inserting method, that is, the watermark inserting method using the deforming of the scale factor index. That is, the deforming of the scale factor index is performed in association with the bit allocation and transmission pattern determination process using the SCale Factor Selection Information (SCFSI).

In other words, as described above, three initial scale factor indices determined at each of the sub-bands may not be in future transmitted by the SCFSI. In the same manner, since the transmission is not performed for the sub-band to which the bit is not allocated, the watermark is inserted with reference to such information.

Alternatively, a method of detecting the inserted binary watermark using the MPEG audio decoder is illustrated in FIG. 6.

FIG. 6 is a block diagram illustrating the MPEG audio decoder having the audio watermark detecting apparatus according to the present invention.

As shown in FIG. 6, the MPEG audio decoder includes a demultiplexer 21 for extracting necessary information from the transmitted bit stream; a watermark extracting and scale factor decoding unit 23 for decoding the scale factor on the basis of the extracted information and extracting the watermark; an inverse quantizer 22 for inversely quantizing the sub-band sample by using the decoded scale factor and the bit allocation information; and a synthesis sub-band filter bank 24 for transforming the inversely quantized sub-band samples into time-domain samples and synthesizing the transformed time-domain samples to output a final audio signal.

In other words, the MPEG audio decoding process using the watermark extracting apparatus is performed inversely to the MPEG audio encoding process. First of all, necessary information such as the bit allocation information, the SCale Factor Selection Information, the scale factor index, and the quantized sub-band sample in addition to the header information is extracted from the compressed and transmitted bit stream in the demultiplexer 21.

The scale factor is decoded on the basis of the extracted information. At this time, so as to detect the inserted binary watermark, the extracted scale factor indices are sequentially arranged and the even number/odd number is determined, to extract the binary watermark information of 0 and 1. This is arranged in below table 2.

TABLE 2

| Scale factor index | 4 | 1 | 3 | 4 | 7 | 0 | 9 | 0 | 1 | 3 | 6 | 0 |
|---|---|---|---|---|---|---|---|---|---|---|---|---|
| Even/Odd |  |  |  |  |  |  |  |  |  |  |  |  |
| Extracted binary watermark |  |  |  |  |  |  |  |  |  |  |  |  |

Table 2 illustrates a process of detecting the watermark from 12 scale factor indices transmitted to a decoding stage.

As shown in Table 2, the even number/odd number of the scale factor index determines the binary watermark '011010101100' inserted in the encoding process, by using the scale factor index of the Table 1.

Through the above process, the watermark is extracted in the watermark extracting and scale factor decoding unit 23.

Meanwhile, the watermark extracting and scale factor decoding unit 23 decodes the scale factor through the scale factor index. The inverse quantizer 22 inversely quantizes the sub-band sample by using the decoded scale factor and the earlier extracted bit allocation information.

The synthesis sub-band filter bank 24 transforms the inversely quantized sub-band samples into time-domain samples and synthesizes the transformed time-domain samples, to obtain a finally decoded audio signal (PCM).

At this time, even in case where the scale factor index, into which the watermark is not inserted, of a general audio bit stream enters the watermark extractor 23, it can be determined whether or not the scale factor index is the even number/odd number. Therefore, the binary value can be detected.

Since the binary value is meaningless information, the secret/public key is used or a predetermined synchronization signal (syncword) is inserted at the time of inserting the bit stream of the watermark signal, so as to distinguish meaning watermark information from the meaningless information.

Alternatively, as described above, the deformation of the scale factor index using the watermark insertion does not generate the additional noise or distortion in the audio compressed encoding and decoding process.

This is because the real sub-band sample is normalized in the encoding stage with reference to the scale factor index to be finally transmitted, and the decoding stage restores the sub-band sample by the same scale factor.

Alternatively, the bit stream watermarking using the scale factor according to the present invention has a disadvantage in that since the number of the transmitted scale factors is not fixed, an information amount of a transmittable watermark cannot be exactly expected.

Specifically, in case where the audio frame corresponding to a null(mute) interval is encoded, the bit-allocated sub-band may not be provided, and the watermark cannot be transmitted at the audio frame.

Accordingly, in order to solve this, a minimal bit number of watermarks to be transmitted per frame is previously set. Further, the bit is forcibly allocated to an arbitrary sub-band into which the bit is not allocated in case where only the number of scale factors less than the minimal bit number of watermarks to be transmitted per frame. Furthermore, the scale factor index of a corresponding band is transmitted.

At this time, the sub-band samples are all defined as zero and transmitted for the sub-band to which the bit is forcibly allocated for the watermark transmission.

By doing so, a result of "0" is provided in the decoding process. Therefore, the watermark can be additionally inserted as many as a desired bit number without any influence on a sound quality.

However, in this case, more bits than those required for the MPEG audio encoding are used to perform the encoding. This cannot be regarded as a bit waste since these extra bits come from zero stuffing portion being appeared in the corresponding frame to keep a fixed bit rate.

Alternatively, by bundling several frames to adjust the watermark bit rate at each of large units rather than maintaining a fixed watermark bit rate at each of frames, a transmitted amount of the watermark at each of local frames can be varied.

Meanwhile, in the above description, the present invention is applied to the MPEG layer-II audio encoding method being one of the high quality audio encoding methods. However, the present invention is not only applicable to other high quality audio encoding methods referring to a table having the scale factor index and the like, but also is applicable to an image and video encoding method and the like.

As described above, the digital audio watermarking apparatus and method according to the present invention has the following effects.

First, there is an effect in that the additional noise or distortion is not caused while the watermark is effectively inserted in the audio compression encoding and decoding process by changing the scale factor index to be transmitted to insert the watermark into the bit stream in the high quality audio encoding process.

Second, there is an effect in that separate information different from the audio signal is transmitted to a predetermined decoder, by generating the bit stream having a compatibility with a conventional decoder through the watermark insertion according to the present invention. That is, there is an effect in that the compatibility with the conventional decoder is maintained while a separate information transmission channel is secured.

Third, there is an effect in that in case where the watermark extracting method according to the present invention is informed only to a specific user, a corresponding watermark is utilized as a secret communication.

Fourth, there is an effect in that the high quality audio encoding and audio watermarking method according to the present invention can be implemented just only by the adding of a little operation amount since the insertion and extraction process is so simple.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital audio watermark inserting method that encodes a digital audio signal by using a scale factor table, the method comprising an encoder for:
    transforming the digital audio signal into a plurality of sub-band samples;
    extracting a scale factor for each of the plurality of sub-band samples, wherein each scale factor comprises an amplitude factor of the corresponding sub-band sample;
    transforming the extracted scale factor for each of the plurality of sub-band samples into a scale factor index using the scale factor table;
    inserting a watermark signal into the scale factor index for each of the plurality of sub-band samples, wherein one scale factor index is allocated for every bit of the watermark signal,
    wherein the watermark signal is inserted into the scale factor index for each of the plurality of sub-band samples during the process of transforming the extracted scale factor for each of the plurality of sub-band samples, and
    wherein a minimal bit number of a watermark signal per frame to be transmitted is predetermined; and
    forcibly allocating a bit to an arbitrary sub-band and inserting the watermark signal in a corresponding scale factor index if the scale factor is transmitted less than the predetermined bit number of the watermark signal per frame.

2. The method of claim 1, further comprising changing the scale factor index for each of the plurality of sub-band samples to an even number or an odd number depending on the value of the bit of the corresponding watermark signal.

3. The method of claim 2, further comprising changing the scale factor index for each of the plurality of sub-band samples to the even number if the bit of the corresponding watermark signal is "0".

4. The method of claim 2, further comprising changing the scale factor index for each of the plurality of sub-band samples to the odd number if the bit of the corresponding watermark signal is "1".

5. The method of claim 1, further comprising not inserting the watermark signal if the scale factor index is "0".

6. The method of claim 1, wherein each of the plurality of sub-band samples are defined as "0", for the sub-band to which the bit is forcibly allocated to insert the watermark signal.

7. The method of claim 1, wherein the frames to be transmitted are bundled to adjust a watermark bit rate.

8. The method of claim 1, further comprising using a secret or public key to distinguish each of the inserted watermark signals from other signals.

9. The method of claim 1, further comprising using a predetermined synchronization signal to distinguish each of the inserted watermark signals from other signals.

10. A digital audio watermark inserting method in which a watermark signal is inserted into a digital audio signal by using a digital audio encoding step, the method comprising an encoder for:
    transforming the digital audio signal into a plurality of sub-band samples to eliminate a statistic redundancy of the digital audio signal;
    extracting a scale factor for each of the plurality of sub-band samples, wherein the scale factor comprises an amplitude factor of the corresponding transformed sub-band sample;
    transforming the digital audio signal into a frequency area through Fourier transformation;
    obtaining a masking threshold for each of the plurality of sub-band samples, the masking threshold comprising an inaudible noise level referenced to the corresponding extracted scale factor at the transformed frequency area;
    calculating an Signal-to Mask Ratio (SMR) at each of the plurality of sub-band samples according to the corresponding masking threshold;
    allocating a bit to each of the plurality of sub-band samples on the calculated SMR;
    transforming the scale factor for each of the plurality of sub-band samples into a scale factor index by using a scale factor table according to an encoding standard of the digital audio signal;
    inserting the watermark signal into the corresponding transformed scale factor index;
    quantizing the plurality of sub-band samples by using the bit allocated to each of the plurality of sub-band samples and the corresponding scale factor index;
    generating the quantized signal as a bit stream,
    wherein the watermark signal is inserted into the scale factor index for each of the plurality of sub-band samples during the process of transforming the extracted scale factor for each of the plurality of sub-band samples;
    forcibly allocating the bit to a sub-band sample depending on a predetermined minimal bit number of the watermark signal to be transmitted per frame;
    setting an arbitrary even or odd number of the scale factor index associated to the watermark signal to be inserted; and
    defining the bit allocated to the plurality sub-band samples as "0".

11. The method of claim 10, wherein inserting the watermark signal comprises allocating one scale factor index for every bit of the watermark signal to change the scale factor index to an even number or an odd number depending on a value of the bit of the watermark signal.

12. A digital audio watermark inserting apparatus in which a watermark signal is inserted into a digital audio signal by using a digital audio encoder, the apparatus comprising:
    a sub-band filter bank for transforming the digital audio signal into a plurality of sub-band samples;
    a scale factor extractor for extracting a scale factor for each of the plurality of sub-band samples, wherein each scale factor comprises an amplitude factor of the corresponding transformed sub-band sample; and a watermark inserting and scale factor encoding unit for transforming each extracted scale factor into a scale factor index by using a scale factor table depending on an encoding standard specification of the digital audio signal, and changing each scale factor index to insert the watermark signal into the corresponding scale factor index, wherein one scale factor index is allocated for every bit of the watermark signal, and wherein a minimal bit number of the watermark signal per frame to be transmitted is predetermined; and the watermark inserting and scale factor encoding unit forcibly allocating a bit to an arbitrary sub-band and inserting the watermark signal in a corresponding scale factor index if the scale factor is transmitted less than the predetermined bit number of the watermark signal per frame.

13. The apparatus of claim 12, wherein the watermark inserting and scale factor encoding unit change the scale factor index to the even number or the odd number depending on a value of the bit of the watermark signal.

* * * * *